United States Patent
Tsai et al.

(10) Patent No.: US 6,619,944 B2
(45) Date of Patent: Sep. 16, 2003

(54) SENSING AND RECKONING MECHANISM FOR INJECTION MACHINE

(75) Inventors: Lang-Fu Tsai, Hsinchu (TW); Ken Hsien Lai, Tao-Yuan (TW); Kuo Hsiung Lin, Miao-Li Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 233 days.

(21) Appl. No.: 09/840,986

(22) Filed: Apr. 25, 2001

(65) Prior Publication Data

US 2002/0034560 A1 Mar. 21, 2002

(30) Foreign Application Priority Data

Aug. 11, 2000 (TW) .................................... 89213935 U

(51) Int. Cl.$^7$ ............................................... B29C 45/77
(52) U.S. Cl. ...................................... 425/170; 425/149
(58) Field of Search ................................ 425/149, 169, 425/170

(56) References Cited

U.S. PATENT DOCUMENTS

| | | | | |
|---|---|---|---|---|
| 4,961,696 A | * | 10/1990 | Yamamura | 425/149 |
| 5,206,034 A | * | 4/1993 | Yamazaki | 425/149 |
| 5,209,936 A | * | 5/1993 | Ihara et al. | 425/149 |
| 5,997,780 A | * | 12/1999 | Ito et al. | 425/149 |
| 6,461,139 B1 | * | 10/2002 | Yokoya et al. | 425/149 |

* cited by examiner

*Primary Examiner*—James P. Mackey
(74) *Attorney, Agent, or Firm*—Rabin & Berdo, P.C.

(57) ABSTRACT

An injection unit of injection machine operates to drive a time-belt pulley associated with a thrust bearing, a bevel ball-bearing, and a bearing nut to make a ball-bearing guiding screw move swiftly to in turn drive a movable plate to perform an injection stroke. The injection pressure transmitted backwards by a plasticized auger is sensed by a load bearer equipped with a pressure sensor something like a strain gauge. After an injection stroke, by means of another time-belt pulley and a shaft coupling, the plasticized auger is restored to its original position and ready for a next cyclic motion. During the cyclic injection process, the load bearer is in charge of sensing the pressure change and reckoning the back pressure in order to obtain the best injection quality.

11 Claims, 5 Drawing Sheets

SENSING AND RECKONING MECHANISM FOR INJECTION MACHINE

FIELD OF THE INVENTION

This invention relates to an injection unit of the injection machine, which is particularly equipped with a pressure sensor for feedback of a signal so as to control injection operation of the injection machine more precisely.

BACKGROUND OF THE INVENTION

In order to monitor and control injection operation effectively and heighten stability and reliability thereof, a load bearer is usually applied in an injection machine for sensing the injection forward and back pressure during injection operation. More particularly, for driving a servomotor, signal of the load bearer is necessary for control of the injection pressure, the back pressure, and the release-to-retreat force of the injection machine.

In an "auger and injection structure" widely implemented in existing injection machines as shown in FIG. 1, a load bearer 39 is arranged to sense the injection gel's pressure and the back pressure effectively, and a release-to-retreat path (A) and a gel-injection path (B) are shown in FIG. 2. In this structure, a bearing seat 371 is fixedly locked on a depression base 391, which is locked together with the load bearer 39 and locked directly on a movable depression plate 23 to incur a pressure imposed to the load bearer 39 at the very beginning, thereby and along with a clearance made during assembling, the pressure sensed by the load bearer 39 will somewhat depart from the due value to have badly affected machine's stability and reliability, or the load bearer 39 may become insensitive in response and for output of a correct signal. Moreover, when an auger 17 is driven by a belt pulley 42 to rotate and feed material between a bearing base 46 and the depression plate 23, the sensed value cannot be read from the load bearer 39 directly to result in distortions or errors. Consequently, neither can an output pressure be reckoned precisely, nor can a successful feedback control be made accordingly.

SUMMARY OF THE INVENTION

The primary object of this invention is to provide a sensing and reckoning mechanism equipped with a load bearer that can sense injection gel's pressure and reckon back pressure of an injection machine precisely.

For more detailed information regarding advantages or features of this invention, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE INVENTION

This invention places a particular emphasis on an injection unit provided with a load bearer for sensing injection gel's pressure and reckoning back pressure so as to heighten stability and reliability of an injection machine and eliminate sensing distortions or errors.

Figure 1:
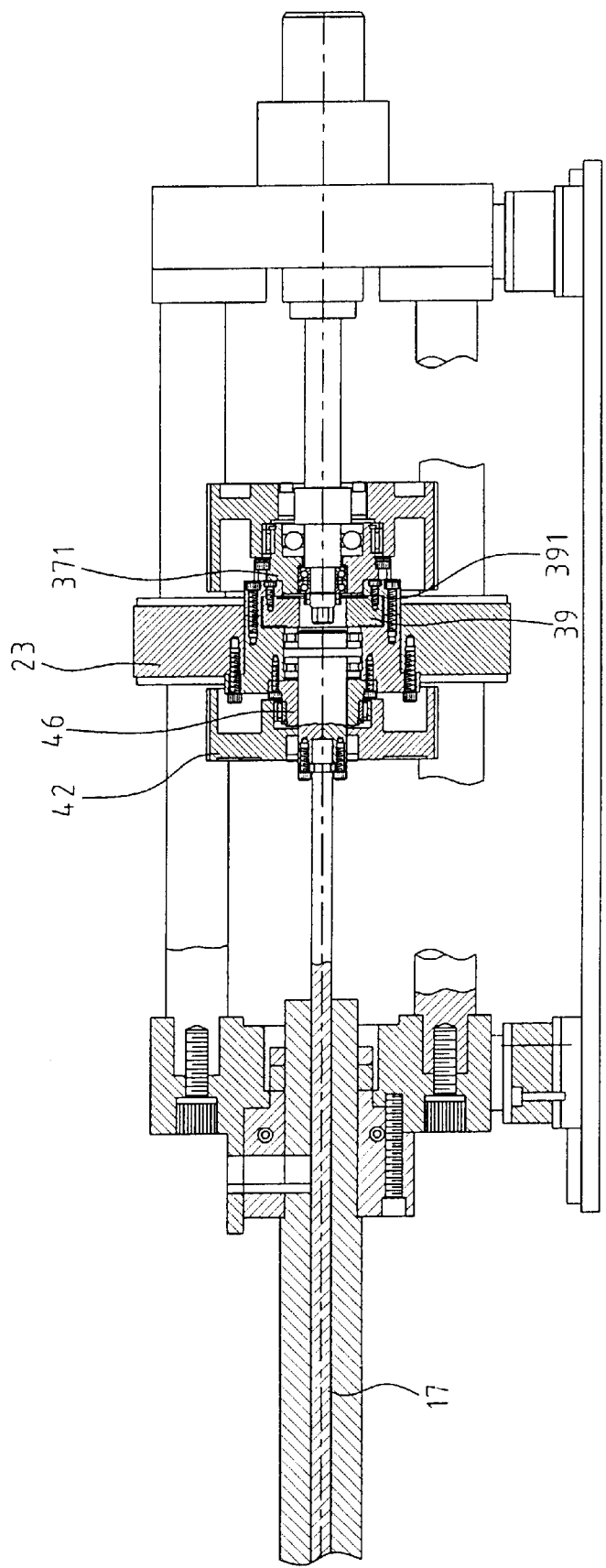
FIG. 1 is a schematic view showing the "auger and injection structure" of an existing conventional injection machine.
Figure 2:
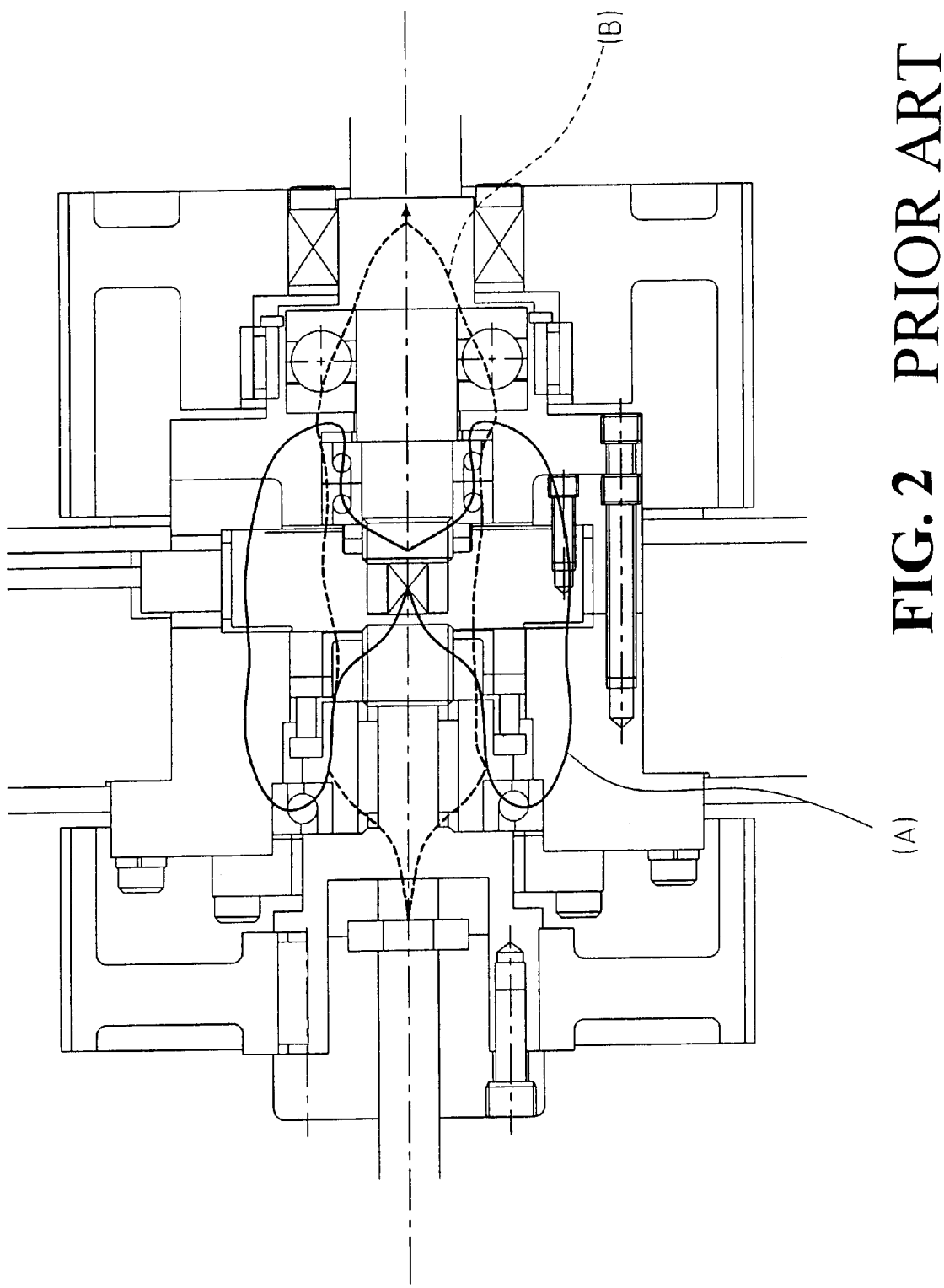
FIG. 2 is a schematic diagram showing the path of injection forward and release-to-retreat backward of a conventional injection machine.
Figure 3:
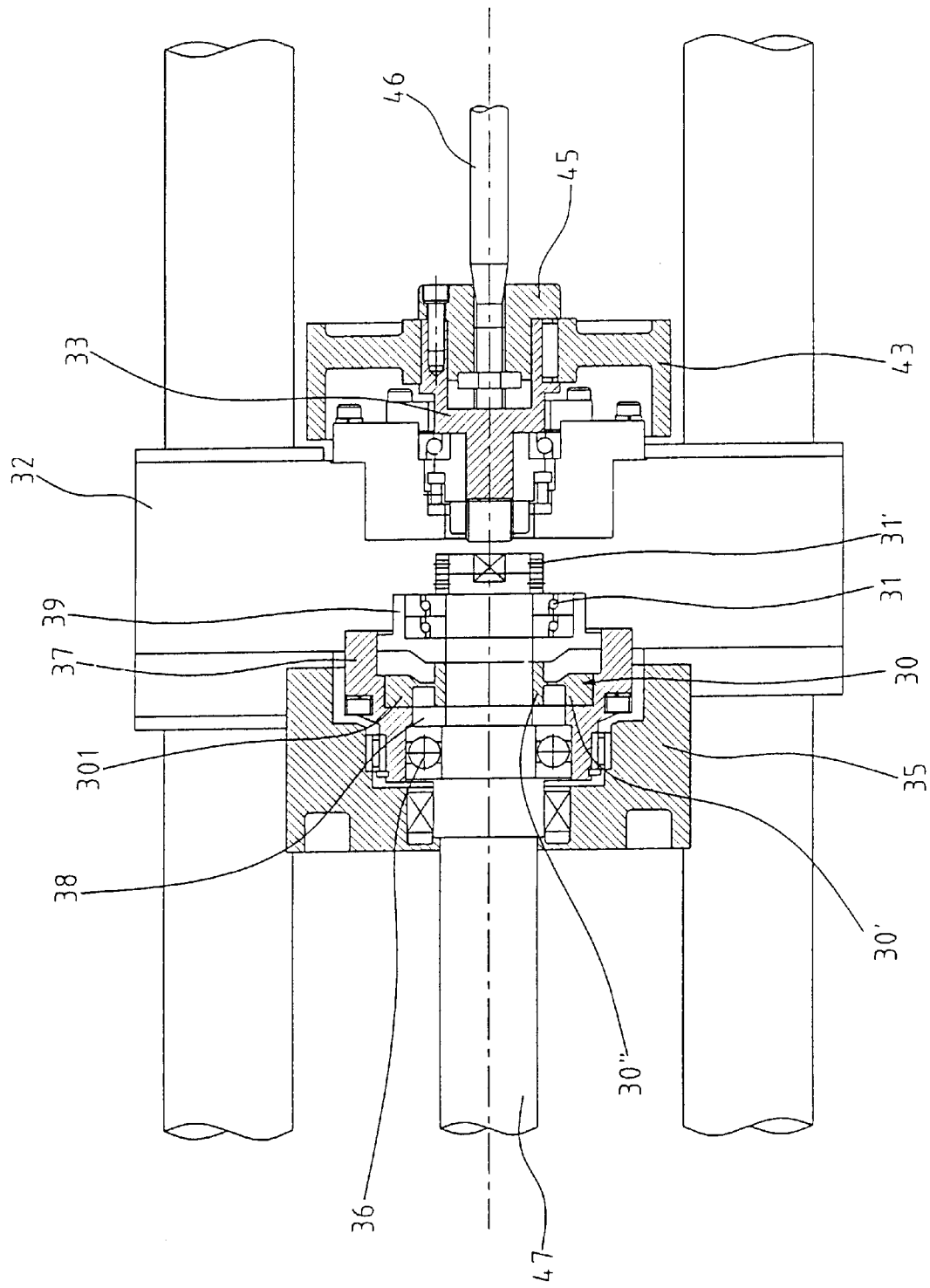
FIG. 3 illustrates a partial structure of an injection machine of this invention.

As indicated in FIG. 3, a load bearer 30 is provided with an inner ring 30" inserted between a separate ring 38 and a bearing collar seat 39 and with an outer ring 30' locked directly to a coupling 37, wherein a bearing nut 31', a bevel ball-bearing 31, and a thrust bearing 36 are combined to press only the inner ring 30" of the load bearer 30 in order not to hinder the load bearer 30 from sensing pressure. The pressure returned from a plasticized auger 46 is transmitted to a movable plate 32 via a screw coupling 33 and a retainer receptacle shaft-fixing plate 45, then through the coupling 37 to apply on the outer ring 30' of the load bearer component 30 to cause a relative displacement. Meanwhile, a pressure sensor, such as strain gauge 301 is disposed on the outer ring 30' of the load bearer 30 which creates a strain voltage in linear ratio for output of a corresponding pressure value feedback to the control system, which is supposed to amend the output of a servomotor basing on pressure difference occurred for direct control of the injection and the back pressure of an injection machine precisely and automatically.

Figure 4:
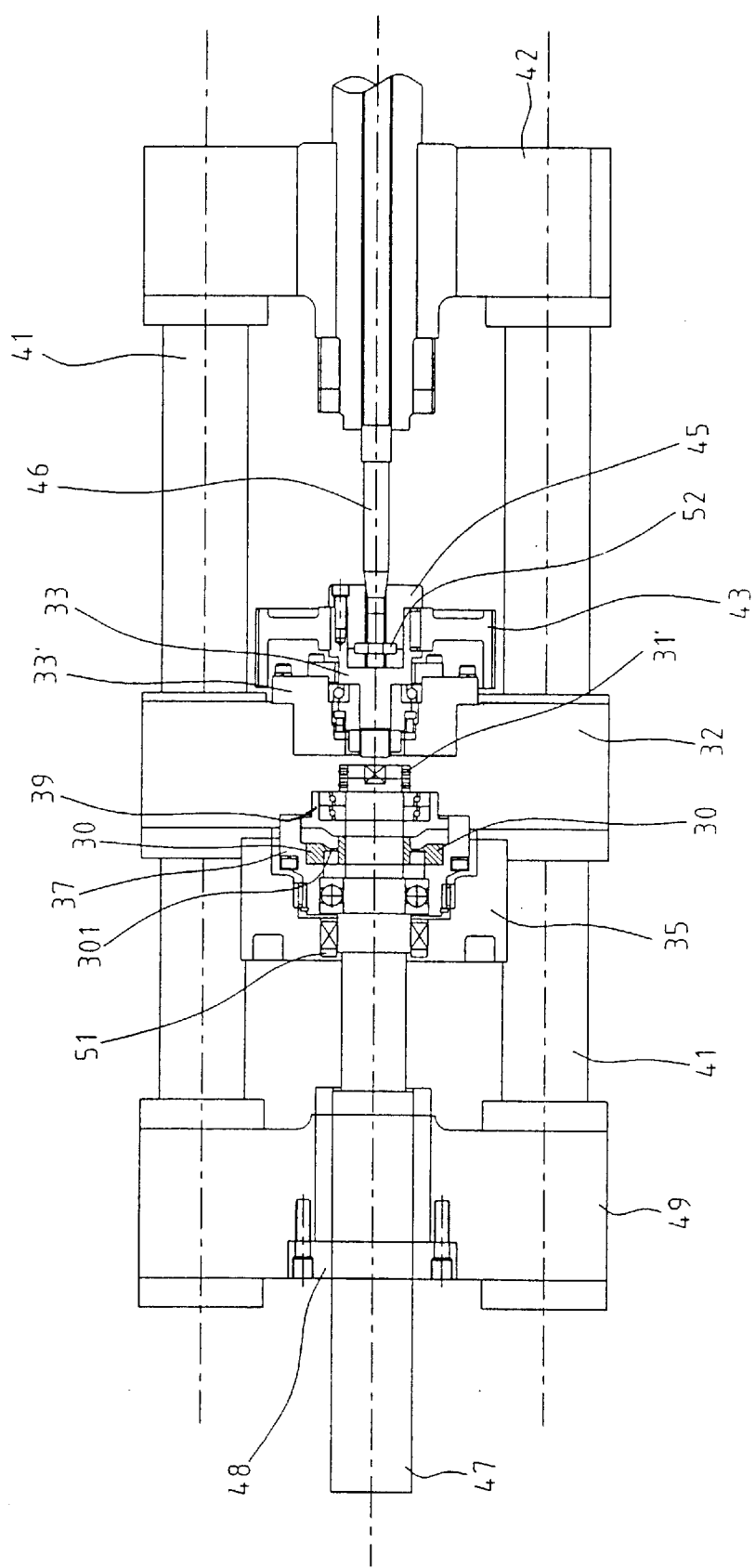
FIG. 4 is a structural view of the injection machine of this invention.

Referring to FIG. 4, this invention mainly comprises a front-bearing plate 42, a rear-bearing plate 49, a ball-bearing guiding screw 47, a nut 48, two fastening rods 41, and the movable plate 32, wherein the rear-bearing plate 49 and the front-bearing plate 42 are arranged to support relative components of the injection unit; those two fastening rods 41 stride over the bearing plates 42, 49; and the movable plate 32 slides on those fastening rods 41. The outer ring of the load bearer 30 is locked to the coupling 37, which is interlocked to each other with the movable plate 32. The bearing nut 31' is implemented to fixedly lock the load bearer 30 to a position between the bearing collar seat 39 and the separate ring 38. A draw band 51 is used to confine the ball-bearing guiding screw 47 to a time-belt pulley 35. When the time-belt pulley 35 is driven by a servomotor to transmit torque to the ball-bearing guiding screw 47 and the nut 48 and enable them to rotate in a thrust bearing 36 and in a bevel ball bearing 31 respectively, then the time belt moves over the bearing nut 31' and the coupling 37 to push the movable plate 32 forward and perform the injection and the pressure-keeping process. Another time-belt pulley 43 is driven by another servomotor to rotate through the shaft-fixing plate 45 and a shaft coupling 33', such that the plasticized auger 46 is rotated to proceed a reckoning process.

In this manner, the load bearer 30 of this invention having a pressure sensor like a strain gauge 301 can be clocked on the coupling 37 between the time-belt pulley 35 and the movable plate 32, wherein the coupling 37 is fixed on the movable plate 32 such that, during injection process, the time-belt pulley 35 is driven to rotate and urge the ball-bearing guiding screw 47 to move swiftly and push the movable plate 32 to go forward accordingly to fulfill an injection stroke under collaboration of the associated thrust bearing 36, the bevel ball-bearing 31, and the bearing nut 31'. At this moment, a feedback signal of the injection gel's pressure from the plasticized auger 46 can be sensed by the load bearer 30 precisely for a so-called close-circuit feedback control. As the shaft-fixing plate 45 and the time-belt pulley 43 are screwed together, the shaft-fixing plate 45 can be driven by another time-belt pulley 43, and because the shaft-fixing plate 45 is fixedly jointed with the plasticized auger 46 by a semilunar ring 52, the plasticized auger 46 is driven to rotate. Moreover, the screw coupling 33 and the time-belt pulley 43 are interlocked together in a retainer receptacle such that the screw coupling 33 will rotate too, and further, the screw coupling 33 is also jointed with the shaft coupling 33', which is connected to the movable plate 32, 50 that the plasticized auger 46 can be restored to its original position for cycling. Now, the back pressure is transferred from the movable plate 32 to the coupling 37 and the separate ring 38 to therefore enable the load bearer 30 to sense the operation pressure for quality control.

Figure 5:
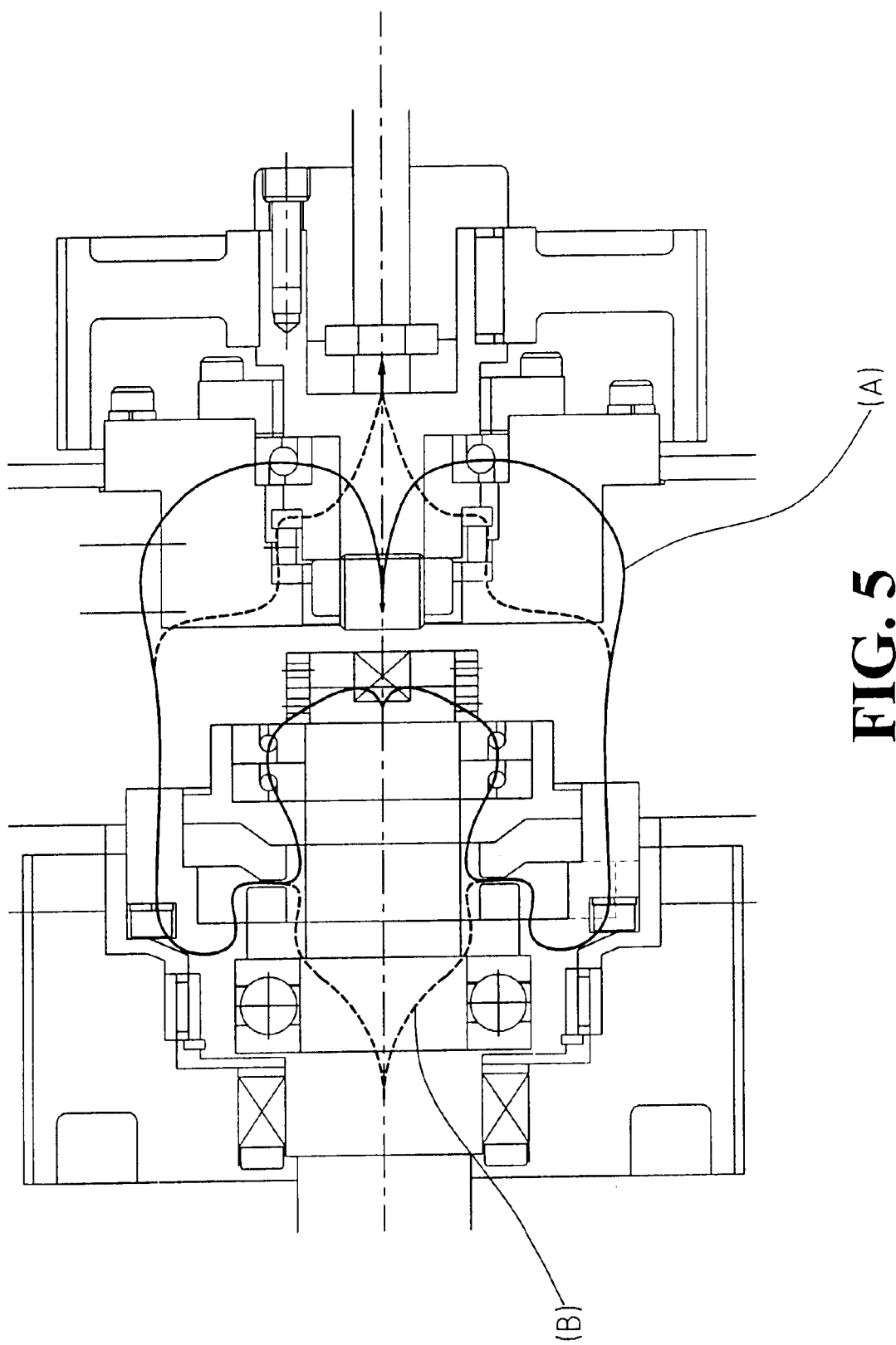
FIG. 5 shows the transmission path of the injection and the back pressure of the injection machine of this invention.

On the contrary, when the time-belt pulley 35 is rotated in reverse, a backward force is applied via the bearing nut 31', the bevel ball-bearing 31, the bearing collar seat 39, the coupling 37, all the way down to the movable plate 32 to release and retreat the same. Now that the release-to-retreat force of the movable plate 32 is detected directly by the load bearer 30, signal feedback and forward in a close circuit are represented by the pressure transmission path (A), (B) shown in FIG. 5. The path (A) illustrates that the time-belt pulley 35 is driven to rotate in reverse to drive the ball-bearing guiding screw 47, then the torque is in turn relayed via the bearing nut 31', the bevel ball-bearing 31, and the bearing collar seat 39 to reach the load bearer 30, where the strain gauge 301 on the load bearer 30 creates a linear-ratio strain voltage expressed in form of a pressure, which is then passed to the coupling 37 and push the same to retreat swiftly. The path (B) illustrates that the time-belt pulley 35 drives the ball-bearing guiding screw 47 to screw forward such that torque is relayed to the separate ring 38 to press against the inner ring 30" of the load bearer 30, then is forwarded to the strain gauge 301 to create a strain voltage and provide an output pressure which is transmitted to the coupling 37 locked laterally to the load bearer 30. As the coupling 37 is screw-locked on the movable plate 32, which then push the screw coupling 33 to force the plasticized auger 46 to move swiftly. In this manner, the load bearer 30 can be sensed precisely.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. An injection unit for an injection machine, comprising:
    a front-bearing plate;
    a rear-bearing plate having a nut;
    two fastening rods, each extending from said front-bearing plate to said rear-bearing plate;
    a movable plate disposed to slide on said fastening rods, and being disposed between said front-bearing plate and said rear-bearing plate;
    a guiding screw threadably engaged with said nut;
    a coupling enclosing a bearing, said coupling being fixed to said movable plate;
    a first time belt pulley disposed on said guiding screw and being connected to said coupling, said first time belt pulley being rotatable relative to said coupling;
    a load bearer locked to the coupling, and having an inner ring;
    a separate ring disposed between the bearing and the inner ring, with one side of the inner ring pressing against said separate ring;
    a bearing collar seat disposed on another side of the inner ring;
    a pressure sensor mounted on said load bearer;
    a plasticized auger that injects a gel at a pressure, with the pressure being detected by the pressure sensor;
    a shaft-fixing plate fixedly joined with said plasticized auger;
    a second time-belt pulley connected to said shaft-fixing plate; and
    a screw coupling connected to said movable plate, and being interlocked with said second time-belt pulley, said auger, and said shaft-fixing plate, said second time-belt pulley and said screw coupling being locked to rotate unitarily.

2. The injection unit according to claim 1, wherein the coupling and the movable plate are fixed with screws.

3. The injection unit according to claim 1, wherein an outer ring of the load bearer and the coupling are locked together.

4. The injection unit according to claim 1, wherein the guiding screw and the first time-belt pulley are fixed with a draw band.

5. The injection unit according to claim 1, further comprising a bevel ball-bearing disposed adjacent to said bearing collar seat:
    wherein the guiding screw includes a bearing nut that locks the bevel ball-bearing, the bearing collar seat, the load bearer, the separate ring, and the coupling together to become a unitary body.

6. The injection unit according to claim 1, wherein the first time-belt pulley drives the guiding screw directly to rotate in the nut.

7. The injection unit according to claim 1, further comprising a semilunar ring, wherein the plasticized auger and the shaft-fixing plate are clenched to each other by the semilunar ring.

8. The injection unit according to claim 1, wherein the second time-belt pulley and the shaft-fixing plate are fixed by screws.

9. The injection unit according to claim 1, further comprising a shaft coupling connected to said screw coupling, wherein the movable plate and a the shaft coupling are fixed by screws.

10. The injection unit according to claim 5, wherein the bearing enclosed by the first time-belt pulley a thrust bearing, a and wherein the first time-belt pulley, the bevel ball-bearing, and the bearing nut cooperate to drives the guiding screw to rotate so as to push the movable plate forward to perform an injection stroke; and to drive the movable plate backwards.

11. The injection unit according to claim 1, wherein the pressure sensor is a strain gauge installed at an outer ring of the load bearer for detecting an injection force, a release-to-retreat force, and for reckoning a back pressure for retreat.

* * * * *